United States Patent
Choi

(10) Patent No.: US 11,442,500 B2
(45) Date of Patent: *Sep. 13, 2022

(54) DISPLAY APPARATUS AND METHOD FOR CONTROLLING THE DISPLAY APPARATUS

(71) Applicant: SAMSUNG ELECTRONICS CO., LTD., Suwon-si (KR)

(72) Inventor: Changwon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/368,988

(22) Filed: Jul. 7, 2021

(65) Prior Publication Data

US 2021/0333822 A1 Oct. 28, 2021

Related U.S. Application Data

(63) Continuation of application No. 16/588,322, filed on Sep. 30, 2019, now Pat. No. 11,112,822.

(30) Foreign Application Priority Data

Mar. 19, 2019 (KR) .................. 10-2019-0031260

(51) Int. Cl.
*G06F 1/16* (2006.01)
*G06T 3/60* (2006.01)

(52) U.S. Cl.
CPC .............. *G06F 1/1601* (2013.01); *G06T 3/60* (2013.01)

(58) Field of Classification Search
None
See application file for complete search history.

(56) References Cited

U.S. PATENT DOCUMENTS 5,134,390 A 7/1992 Kishimoto et al.
8,923,839 B2 12/2014 Park
(Continued)

FOREIGN PATENT DOCUMENTS

KR 10-0926165 B1 11/2009
KR 10-2011-0122556 A 11/2011
(Continued)

OTHER PUBLICATIONS

International Search Report (PCT/ISA/210) dated Jan. 23, 2020 issued by the International Searching Authority in International Application No. PCT/KR2019/012726.
(Continued)

*Primary Examiner* — Christopher J Kohlman
(74) *Attorney, Agent, or Firm* — Sughrue Mion, PLLC

(57) ABSTRACT

Disclosed are a display apparatus and a controlling method thereof. The display apparatus includes a communicator including a circuitry; a display; a motor configured to rotate the display; a memory storing at least one instruction; and a processor configured to execute the at least one instruction to: control the communicator to communicatively connect to an external device based on information related to the display apparatus that is received by the external device from a remote controller to which the external device is tagged, obtain direction information of at least one of the external device and of an image content displayed on the external device, determine, based on the direction information, whether to control the motor to rotate the display, and control the display to display the image content that is received from the external device through the communicator.

18 Claims, 20 Drawing Sheets

(56) References Cited

U.S. PATENT DOCUMENTS

| | | | |
|---|---|---|---|
| 9,594,435 B2 | 3/2017 | Park et al. | |
| 2011/0234379 A1 | 9/2011 | Lee | |
| 2013/0005250 A1* | 1/2013 | Kim | G08C 23/04 |
| | | | 455/41.1 |
| 2014/0009387 A1 | 1/2014 | Hwang | |
| 2014/0232648 A1 | 8/2014 | Park et al. | |
| 2014/0333671 A1 | 11/2014 | Phang et al. | |
| 2014/0358981 A1* | 12/2014 | Miyake | G06F 3/1454 |
| | | | 709/201 |
| 2016/0050449 A1 | 2/2016 | Cho et al. | |
| 2018/0060015 A1 | 3/2018 | Park et al. | |
| 2019/0050964 A1 | 2/2019 | Jang et al. | |
| 2019/0333479 A1 | 10/2019 | Maalouf | |

FOREIGN PATENT DOCUMENTS

| | | |
|---|---|---|
| KR | 10-1303939 B1 | 9/2013 |
| KR | 10-1388147 B1 | 4/2014 |
| KR | 10-2017-0023245 A | 3/2017 |
| KR | 10-1768974 B1 | 8/2017 |
| KR | 10-1874853 B1 | 7/2018 |
| KR | 10-2019-0017614 A | 2/2019 |

OTHER PUBLICATIONS

Written Opinion (PCT/ISA/237) dated Jan. 23, 2020 issued by the International Searching Authority in International Application No. PCT/KR2019/012726.

Communication dated Dec. 21, 2021 issued by the European Patent Office in European Application No. 19919622.1.

\* cited by examiner

DISPLAY APPARATUS AND METHOD FOR CONTROLLING THE DISPLAY APPARATUS

CROSS-REFERENCE TO RELATED APPLICATION(S)

This application is a continuation application of U.S. patent application Ser. No. 16/588,322, filed Sep. 30, 2019, which claims priority under 35 U.S.C. § 119 to Korean Patent Application No. 10-2019-0031260, filed on Mar. 19, 2019, in the Korean Intellectual Property Office, the disclosures of which are incorporated herein in their entirety by reference.

BACKGROUND

1. Field

The disclosure relates to a display apparatus and a controlling method thereof, and more particularly, to a display apparatus capable of rotating a display based on direction information that is received from an external device, and a controlling method thereof.

2. Description of Related Art

Screen mirroring technology is a technology for transmitting image content being displayed on one device (source device) of two devices to the other device (sink device). Screen mirroring technology is primarily used to output a device having a relatively small screen on a screen larger than a TV display, such as a smartphone, and is widely utilized in everyday life as well as various conferences.

However, in the case of the related-art screen mirroring technology, users have to go through a process of executing a screen mirroring application on a source device and selecting a sink device for outputting a screen of the source device. That is, there is a drawback that a user has to go through various procedures in order to implement the screen mirroring technology.

In the related-art, there is a drawback in that an image content which has been displayed in a full screen when the image content that was displayed in the vertical direction (portrait) is not displayed in a full screen, when the screen mirroring is performed in a landscape direction sink device.

SUMMARY

Provided are a display apparatus capable of rotating a display, when an external device is tagged on a remote controller that controls the display apparatus, based on direction information that is received by connecting communication with the external device, and a controlling method thereof.

Additional aspects will be set forth in part in the description which follows and, in part, will be apparent from the description, or may be learned by practice of the presented embodiments.

According to an embodiment, a display apparatus includes a display apparatus including: a communicator including a circuitry; a display; a motor configured to rotate the display; a memory storing at least one instruction; and a processor configured to execute the at least one instruction to: control the communicator to communicatively connect to an external device based on information related to the display apparatus that is received by the external device from a remote controller to which the external device is tagged, obtain direction information of at least one of the external device and of an image content displayed on the external device, determine, based on the direction information, whether to control the motor to rotate the display, and control the display to display the image content that is received from the external device through the communicator.

The processor may be further configured to execute the at least one instruction to receive, from the external device through the communicator, information related to the external device, and to connect to the external device based on the information related to the external device.

The processor may be further configured to execute the at least one instruction to, based on the external device being tagged on a near field communication (NFC) tag of the remote controller to receive the information related to the display apparatus, control the communicator to communicatively connect with the external device.

The processor may be further configured to execute the at least one instruction to: based on a determination that a direction of the external device does not coincide with a direction of the display according to the direction information, control the motor to rotate the display and control the display to display the received image content on the rotated display; and based on a determination that the direction of the external device coincides with the direction of the display according to the direction information, control the display to display the received image content without rotating the display.

The processor may be further configured to execute the at least one instruction to: based on the display being in a landscape direction and the direction of the display not coinciding with the direction of the external device, control the motor to rotate the display to a portrait direction; and based on the display being in the portrait direction and the direction of the display not coinciding with the direction of the external device, control the motor to rotate the display to the landscape direction.

The processor may be further configured to execute the at least one instruction to, based on a direction of the external device being changed while the received image content is being displayed on the display, receive changed direction information from the external device through the communicator, and control the motor to rotate the display according to the changed direction information.

The processor may be further configured to execute the at least one instruction to, based on a determination that the direction of the external device does not coincide with the direction of the display, control the display to display a user interface (UI) item for selecting whether to rotate the display.

The processor may be further configured to execute the at least one instruction to: obtain the direction information of the image content indicating a display direction of the image content by analyzing the image content that is received from the external device through the communicator; and control the display to display a UI for selecting whether to rotate the display, based on the display direction of the image content being determined to be different from a direction of the display.

The processor may be further configured to execute the at least one instruction to receive, from the external device via the communicator, the direction information indicating a direction of the external device.

The processor may be further configured to execute the at least one instruction to control the display to display the received image content while maintaining a ratio of the received image content during rotation of the display.

According to another embodiment, a controlling method of a display apparatus includes: connecting with an external device based on information related to the display apparatus that is received by the external device from a remote controller to which the external device is tagged; obtaining direction information of at least one of the external device and of an image content displayed on the external device; determining, based on the direction information, whether to rotate a display of the display apparatus; and displaying the image content that is received from the external device.

The connecting may include: receiving, from the external device, information related to the external device, and connecting to the external device based on the information related to the external device.

The connecting may include: based on the external device being tagged on a near field communication (NFC) tag of the remote controller to receive the information related to the display apparatus, connecting with the external device.

The determining whether to rotate the display may include: based on a determination that a direction of the external device does not coincide with a direction of the display according to the direction information, rotating the display and displaying the received image content on the rotated display; and based on a determination that the direction of the external device coincides with the direction of the display according to the direction information, determining to display the received image content without rotating the display.

The rotating the display may include: based on the display being in a landscape direction and the direction of the display not coinciding with the direction of the external device, rotating the display to a portrait direction; and based on the display being in the portrait direction and the direction of the display not coinciding with the direction of the external device, rotating the display to the landscape direction.

The determining whether to rotate the display may include: based on a direction of the external device being changed while the received image content is being displayed on the display, receiving changed direction information from the external device, and rotating the display according to the received changed direction information.

The displaying the image content may include: based on a determination that the direction of the external device does not coincide with the direction of the display, displaying a user interface (UI) item for selecting whether to rotate the display.

The obtaining the direction information may include obtaining the direction information of the image content indicating a display direction of the image content by analyzing the image content that is received from the external device; and the determining whether to rotate the display may include displaying a UI for selecting whether to rotate the display, based on the display direction of the image content being determined to be different from a direction of the display.

The obtaining the direction information may include receiving, from the external device, the direction information indicating a direction of the external device.

The displaying the image content may include: displaying the received image content while maintaining a ratio of the received image content during rotation of the display.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Examples described hereinafter are to facilitate understanding of the disclosure, and it should be understood that various changes can be made to examples described herein and the disclosure can be embodied in different forms. In addition, in the following description, detailed descriptions of well-known functions or configurations may be omitted where they would unnecessarily obscure the disclosure. In addition, it should be noted that the attached drawings are for facilitating easy understanding of the disclosure, and are not illustrated as actually scaled, and dimensions of some elements may be exaggerated.

The order of each step in the description of the disclosure does not necessarily represent the case in which a preceding step is to be performed prior to a subsequent step, and it should be understood that the order of each step may not be limited. That is, even if the process described as a subsequent step is performed before the process described as a preceding step, the nature of the disclosure is not affected and the scope of rights should be defined regardless of the order of the step.

In this specification, expressions "having," "may have," "includes," or "may include," or the like may refer to presence of the corresponding feature (for example: a numerical value, a function, an operation, or a component) and does not exclude the presence of additional features.

In the description, the disclosed components of each embodiment are not necessarily limited thereto. Thus, some components may be changed or omitted, and other components may be added. In addition, the components may be distributed in different independent devices.

It is understood that, hereinafter, expressions such as "at least one of," when preceding a list of elements (e.g., "at least one of A and B" or "at least one of A or B"), modify the entire list of elements (i.e., only A, only B, or both A and B) and do not modify the individual elements of the list.

Hereinafter, one or more embodiments will be described with reference to the drawings.

Figure 1:
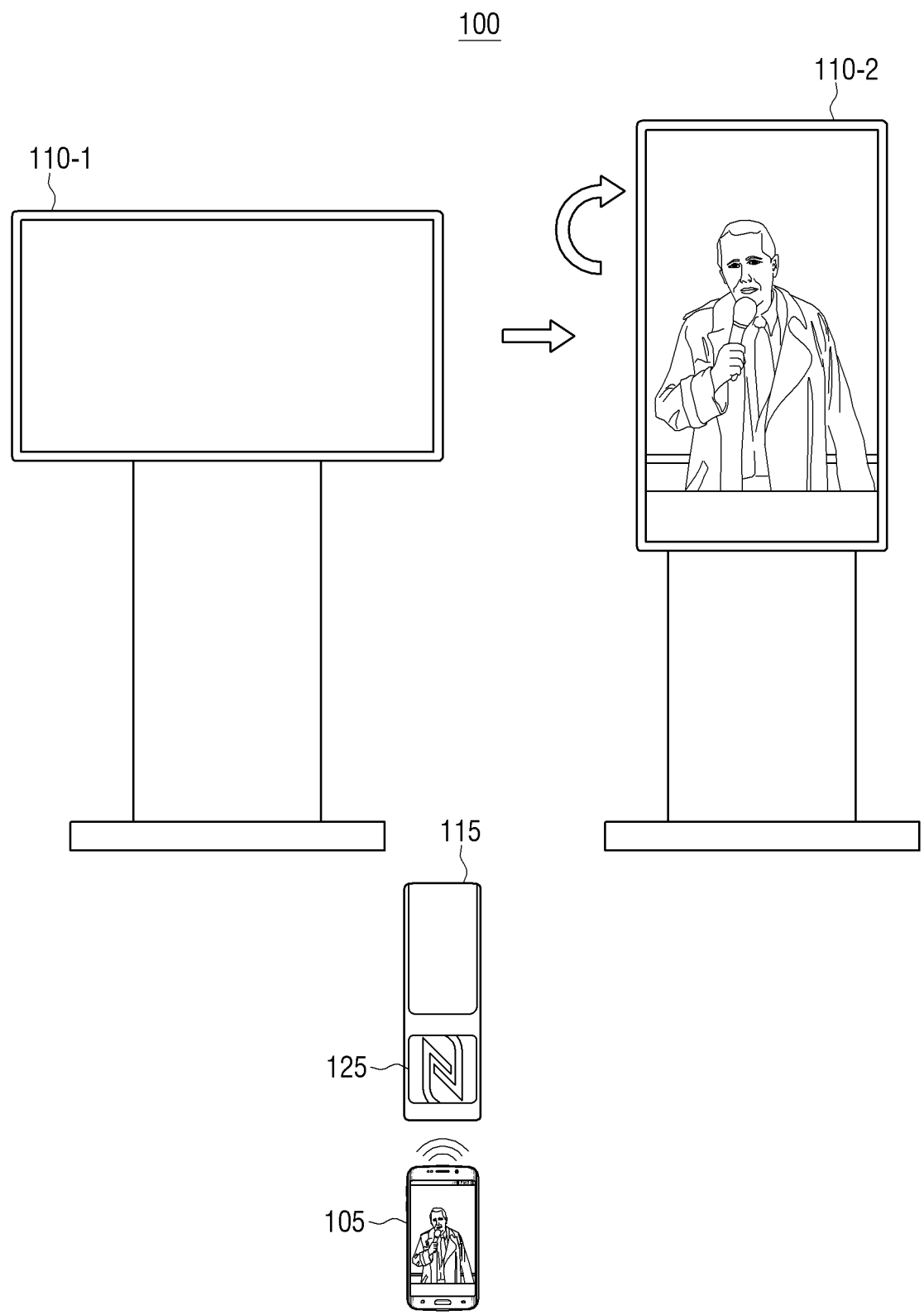
FIG. 1 is a view of a display apparatus that rotates a display while displaying an image content received from an external device according to an embodiment.

FIG. 1 is a view of a display apparatus 100 that rotates a display 110 while displaying an image content received from an external device 105 according to an embodiment. As illustrated in FIG. 1, when an external device 105 is tagged on a remote controller 115 (e.g., reads a near field communication (NFC) tag 125 on the remote controller 115) for controlling a display apparatus 100, the display apparatus 100 may communicatively connect with the external device 105 through a communicator 150 (FIG. 2) based on the information related to the display apparatus 100 received by the external device 105 from the remote controller 115. In addition, the display apparatus 100 may receive direction information and image content from the external device 105 and rotate the display 110 based on the received direction information. Furthermore, the display apparatus 100 may display the image content received from the external device 105 via the communicator 150 on the rotated display 110.

The external device 105 described in FIG. 1 may be an electronic device capable of performing a communication connection. By way of communication, the external device 105 may include at least one of a smartphone including a near field communication (NFC) reader, a tablet personal computer (PC), a mobile device, a video phone, an e-book reader, a desktop PC, a laptop PC, a netbook computer, a workstation, a server, a personal digital assistant (PDA), a portable multimedia player (PMP), a medical device, a camera, a wearable device, a multimedia storage, etc.

When the external device 105 is tagged on the remote controller 115 that controls the display apparatus 100, the display apparatus 100 may connect with the external device 105 through the communicator 150 based on information related to the display apparatus 100 received by the external device 105 from the remote controller 115. According to an embodiment, when the external device 105 is tagged on a near field communication (NFC) tag 125 that includes information related to the display apparatus 100 that is embedded in the remote controller 115 or externally mounted, the display apparatus 100 may connect (e.g., communicatively connect) with the external device 105. The NFC may be a non-contact near field wireless communication scheme using a 13.56 MHz frequency band. Using the NFC technology, information may be transceived when a plurality of terminal devices access each other within a short distance, such as within about 10 cm. Therefore, when (e.g., based on) the external device 105 is tagged on the NFC tag 125 that is embedded in or externally mounted on the remote controller 115, information of the display apparatus 100 (for example, at least one of identification information, MAC address, etc., of the display apparatus 100) and a command to display the image content received from the external device 105 may be transmitted to the external device 105. When (e.g., based on) the external device 105 transmits information related to the external device 105 to the display apparatus 100 using the information related to the display apparatus 100 such as the MAC address of the display apparatus 100 received from the remote controller 115, the display apparatus 100 may receive information related to the external device 105 through the communicator 150. The display apparatus 100 may connect (e.g., communicatively connect) with the external device 105 based on the information related to the external device 105. The information related to the external device 105 may include at least one of a network environment, an Internet protocol (IP) address, a security setting mode, a communication history, or the like.

The communication method between the display apparatus 100 and the external device 105 may be a method using a mobile communication network such as 3G, 4G, 5G, Long Term Evolution (LTE), etc., a method of using near field or short range wireless communication such as Zigbee, Z-wave, Bluetooth (BT), infrared (IR), etc., a method of using a local area network such as Wi-Fi, a method of wired communication or wired network communication, or the like. It is understood, however, that these are merely exemplary, and the display apparatus 100 and the external device 105 may be communicatively connected by using various methods.

When (e.g., based on) the display apparatus 100 performs a communication connection with the external device 105, the display apparatus 100 receives direction information (e.g., orientation information) from the external device 105. In an embodiment, the display apparatus 100 may confirm the direction (e.g., orientation) of the external device 105 through an application programming interface (API) of the external device 105. The API refers to a language or message format used in communication between an operating system and an application program in the external device 105. The display apparatus 100 may receive direction information of the current external device 105 displayed in or provided by the API of the external device 105.

The display apparatus 100 may determine whether to rotate the display 110 (FIG. 2) based on the direction information received from the external device 105, received through the communicator 150. Specifically, when it is determined that the direction of the external device 105 and the direction of the display 110 do not coincide with each other based on the received direction information of the external device 105, the display apparatus 100 may control a motor 130 (FIG. 2) to rotate the display 110. In addition, when it is determined that the direction of the external device 105 coincides with the direction of the display 110, the display apparatus 100 may prevent the display 110 from rotating or control to not rotate the display 110. According to an embodiment, when the display 110-1 is in a landscape direction or a horizontal direction (i.e., in which a width is greater than a height), and the direction of the display 110-1 and the direction of the external device 105 do not coincide with each other, the display apparatus 100 may rotate the display 110-1 to a portrait direction or vertical direction (i.e., in which the height is greater than the width). When the display 110 is in the portrait direction 110-2, and the direction of the display 110 and the direction of the external device 105 do not coincide with each other, the display apparatus 100 may rotate the display 110 to the landscape direction.

In addition, the display apparatus 100 may receive direction information of the external device 105 in real time via the communicator 150 and determine whether to rotate and rotate the display 110 accordingly. Specifically, when the direction of the external device 105 is changed while displaying the image content, the display apparatus 100 may receive the changed direction information from the external device 105 through the communicator 150, and rotate the display 110 based on the received information.

The display apparatus 100 may ask the user whether to rotate the display 110 based on the received direction information. For example, according to an embodiment, if the display apparatus 100 determines that the direction of the external device 105 does not coincide with the direction of the display 110, the display apparatus 100 may display a user interface (UI) (e.g., UI item, graphical user interface (GUI) item, icon, etc.) asking whether to rotate the display 110. Thus, the display apparatus 100 may rotate the display 110 upon receiving an instruction (e.g., selection of the UI item) to rotate the display 110 from the user.

Meanwhile, the display apparatus 100 may display an image content received from the external device 105 when communicatively connected with the external device 105 via the communicator 150. That is, the display apparatus 100 may control the display 110 to display the same screen as the screen of the external device 100. In addition, the display apparatus 100 may determine that the direction of the external device 105 and the direction of the display 110 do not coincide with each other, and may display an image content received from the external device while rotating the display 110. In an embodiment, the display apparatus 100 may display the image content while maintaining a ratio of the image content received while the display 110 is rotating.

In addition, the display apparatus 100 may also autonomously determine or infer the direction of the external device 105. Specifically, the display apparatus 100 may analyze the image content received from the external device 105 to determine a display direction of the image content. In an embodiment, the display apparatus 100 may calculate the landscape ratio and/or portrait ratio of image content received through the communicator 150 from the external device 105. The display apparatus 100 may determine the direction of the image content in the landscape direction when a calculation result that the aspect ratio of the image content is greater than the portrait ratio is derived. According to another embodiment, the display apparatus 100 may determine the direction of the image content based on an object (e.g., text, face, person, thing, image, etc.) included in the received image content. For example, the display apparatus 100 may determine the direction of the object and determine a direction of the image content based on the direction of the object. Thus, when the display apparatus 100 determines that the person or the background image included in the image content may be displayed in a full screen on the display 110 in the landscape direction, the display apparatus 100 may determine the direction of the image content in the landscape direction. When the direction of the display 110 is determined as the portrait direction and the direction of the image content is determined as the landscape direction, the display apparatus 100 may display a UI for inquiring whether to rotate the display 110 (or may simply rotate the display without inquiring from a user). Therefore, the display apparatus 100 may determine whether to rotate the display 110 according to a user selection.

Figure 2:
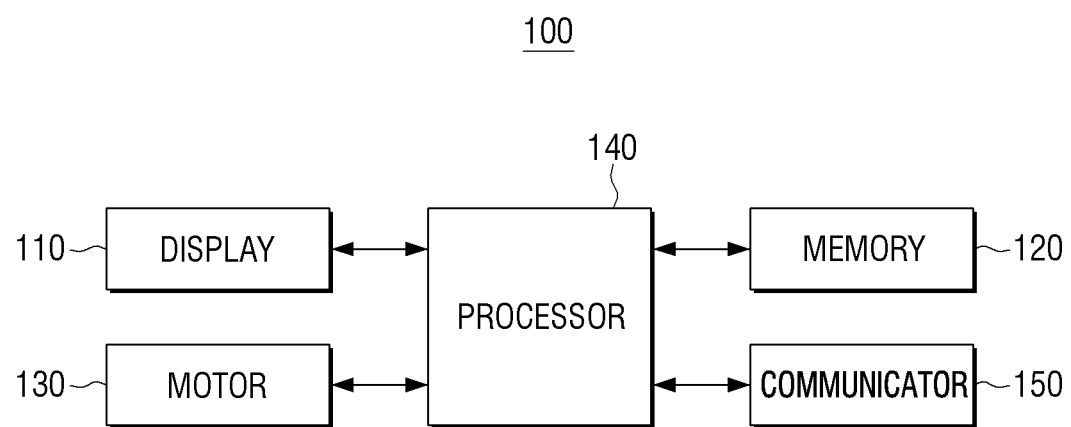
FIG. 2 is a block diagram briefly illustrating a configuration of a display apparatus according to an embodiment.

As illustrated in FIG. 2, the display apparatus 100 may include a display 110, a memory 120, a motor 130, a processor 140, and a communicator 150. However, it is understood that one or more other embodiments are not limited thereto, and some configurations and/or components may be added or omitted depending on the type of the display apparatus 100.

The display 110 may display various information according to the control of the processor 140. In particular, the display 110 may display the image content received from the external device 105 by the control of the processor 140. According to an embodiment, if (e.g., based on) the processor 140 determines that the direction of the external device 105 does not coincide with the direction of the display 110, the display 110 may display a UI inquiring the user whether to rotate the display 110 by control of the processor 140. In addition, when the display 110 determines that the display direction of the image content determined by the processor 140 and the direction of the display 110 do not coincide with each other, the display 110 may display a UI inquiring the user whether to rotate the display 110 by control of the processor 140.

The screen ratio of the display 110 may be 16:9, and the display 110 may be implemented as a touch screen along with a touch panel. This is merely an example, however, and it is understood that the display 110 may be implemented in various manners.

The memory 120 may store instructions and/or data that are related to at least one other element of the display apparatus 100. To be specific, the memory 120 may be implemented as at least one of a non-volatile memory, a volatile memory, a flash memory, a hard disk drive (HDD), a solid state drive (SSD), or the like. The memory 120 is accessed by the processor 140 and reading, writing, modifying, deleting, and/or updating of data by the processor 140 may be performed. In the disclosure, the term memory may include the memory 120, read-only memory (ROM) in the processor 140, random access memory (RAM), or a memory card (for example, a micro SD card and a memory stick) mounted to the electronic apparatus 100. In addition, the memory 120 may store programs and data for configuring various screens to be displayed in the display area of the display 110.

The memory 120 may also store information related to the external device 105 that is communicatively coupled with or connected to the display apparatus 100. To be specific, when the external device 105 is tagged on the display apparatus 100, the display apparatus 100 may receive information such as the Internet Protocol (IP) address of the external device 105, communication history, security setting mode, a network environment, or the like, and store the same in the memory 120.

The memory 120 may store the direction information of the external device 105. To be specific, when the direction information determined, for example, based on the API of the external device 105 is received by the display apparatus 100, the display apparatus 100 may store the direction information in the memory 120.

The motor 130 may rotate the display 110 according to the control of the processor 140. To be specific, the motor 130 may set the direction of the display 110 to the landscape or portrait direction by rotating the display 110 by 90 degrees (or, in one or more other embodiments, 270 degrees) under the control of the processor 140.

The motor 130 may be located on the rear of the display 110 so as to rotate the display 110, but this is only one example and it is understood that one or more other embodiments may be implemented in various other ways.

The communicator 150 may perform communication with the external device 105. The communicator 150 may be communicatively connected to the external device 105 through a third device (for example, a repeater, a hub, an access point, a server, a gateway, or the like).

Figure 3:
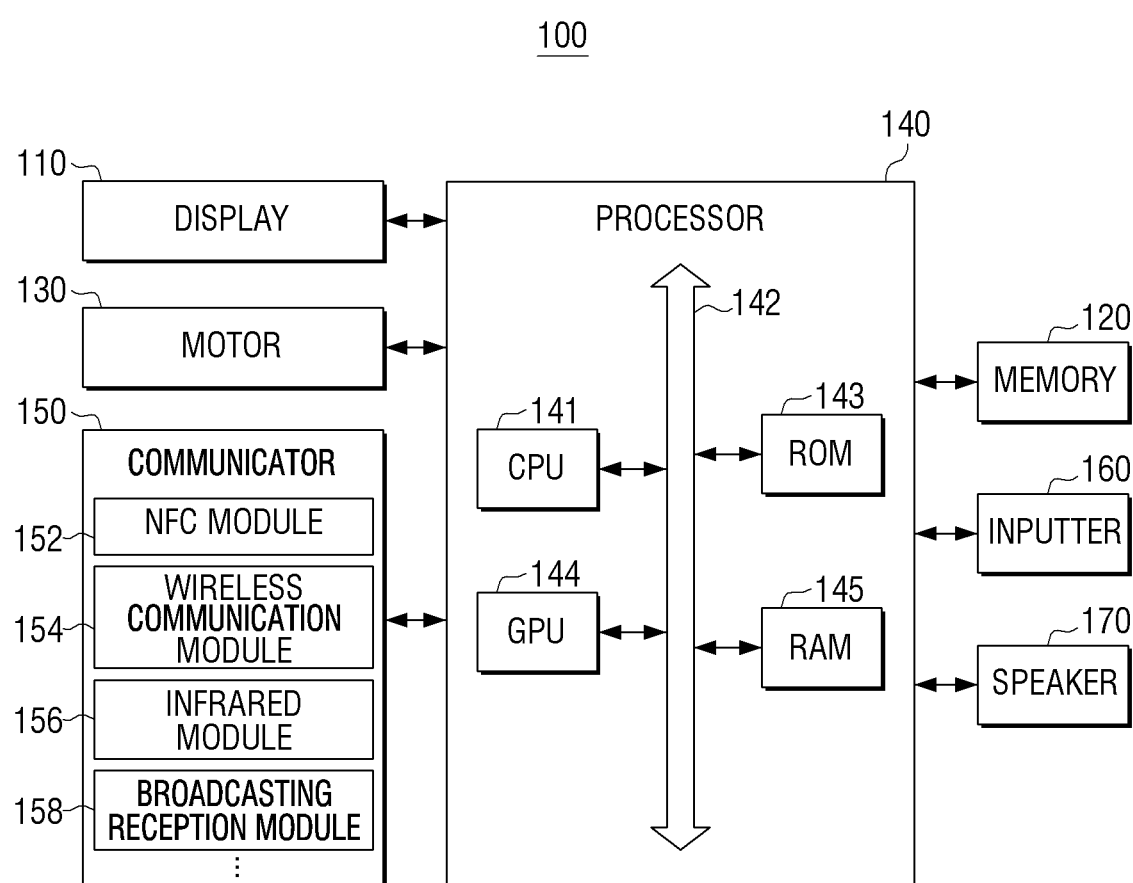
FIG. 3 is a block diagram illustrating in detail of a configuration of a display apparatus according to an embodiment.

The communicator 150 may include various communication modules (e.g., interface circuitry) to perform communication with an external device. For example, the communicator 150 may include an NFC module 152, a wireless communication module 154, an infrared module 156, and a communication or broadcasting reception module 158 (FIG. 3).

The NFC module 152 may be implemented including the NFC tag 125. The NFC tag 125 may include an integrated circuit (IC) and an antenna coil. When the external device 105 equipped with an NFC reader is tagged with or on the NFC tag 125 and accessed within the near field, the NFC tag 125 is driven by the electromagnetic wave emitted from the NFC reader and the NFC tag 125 may transmit, to the external device 105, an RF signal including a command to display the information associated with the display apparatus 100 (for example, the MAC address of the display apparatus 100) recorded in the NFC tag 125 and the image content received from the external device 105 on the display 110. The external device 105 may transmit, to the communicator 150, information related to the external device 105 using the received MAC address of the display apparatus 100.

Specifically, in the antenna coil in the NFC tag 125, current may be induced by electromagnetic waves emitted from the NFC reader of an external device 105. The induced current may be charged in a capacitor provided in the NFC tag 125. The antenna coil in the NFC tag 125 may be composed of a conductor that is wound several times in a shape of a square or a circle. The integrated circuit may be driven by a current charged in a capacitor to generate an RF signal by modulating and coding the information written to the memory in the integrated circuit.

The wireless communication module 154 may include a cellular communication module that uses at least one of, for example, long-term evolution (LTE), LTE Advance (LTE-A), code division multiple access (CDMA), wideband CDMA (WCDMA), universal mobile telecommunications system (UMTS), Wireless Broadband (WiBro), or a Global System for Mobile Communications (GSM), or the like. As another example, the wireless communication module may include, for example, wireless fidelity (WiFi), Bluetooth, Bluetooth Low Power (BLE), Zigbee, magnetic secure transmission, radio frequency (RF), or body area network (BAN).

The infrared module 156 is a module to receive information in infrared rays emitted to the display apparatus 100. As an embodiment, the infrared module 156 may receive the infrared rays including the user input information from the remote controller 115 of the display apparatus 100.

The broadcast reception module 158 may include a terrestrial digital multimedia broadcasting reception module including an antenna for receiving the terrestrial digital multimedia broadcasting signal, a demodulator, an equalizer, a digital multimedia broadcasting (DMB) module for receiving and processing the DMB broadcasting signal, or the like.

The processor 140 (e.g., at least one processor) may be electrically connected to the memory 120 to control the overall operation and function of the display apparatus 100. In particular, when the external device 105 is tagged on the remote controller 115 that controls the display apparatus 100, the processor 140 may connect with the external device 105 through the communicator 150 based on the information related to the display apparatus 100 received by the external device 105 from the remote controller 115. Furthermore, when the communication connection with the external device 105 is performed, the processor 140 may receive direction information from the external device 105, control the motor 130 to rotate the display 110 based on the received direction information, and control the display 110 to display image content received from the external device 105 on the rotated display 110.

In particular, when the external device 105 is tagged on the remote controller 115 having the NFC tag 125 including information related to the display apparatus 100, the processor 140 may connect with the external device 105 through the communicator 150. To be specific, when the external device 105 is tagged on the NFC tag 125 including a command to transmit and/or display the information related to the display apparatus 100 (for example, the MAC address of the display apparatus 100) and the image content received from the external device 105 on the display 110, the processor 140 may receive information related to the external device 105 (for example, the IP address of the external device 105 and network environment) from the external device 105 and connect with the external device 105 based on the related information.

If the communication connection with the external device 105 is disconnected or unstable, the processor 140 may control the communicator 150 to use another stable communication connection means. For example, while the display apparatus 100 and the external device 105 are performing communication using the Zigbee communication method, when the Zigbee communication is disconnected or unstable, the processor 140 may search for a stable communication method, and if the Bluetooth (BT) communication method is found to be a stable communication method, the processor 140 may connect using the BT communication method.

The processor 140 may control the motor 130 to rotate the display 110 based on the direction information received from the communicator 150 from the external device 105. Specifically, when it is determined that the direction of the external device 105 and the direction of the display 110 do not coincide with each other, the processor 140 may control the motor 130 to rotate the display 110, and control the display to display the received image content on the rotated display 110. If the processor 140 determines that the direction of the external device 105 coincides with the direction of the display 110, the processor 140 may control the display 110 to display the received image content without rotating the display 110. Specifically, when the display 110 is in a landscape direction, if the direction of the display 110 and the direction of the external device 105 do not coincide with each other, the processor 140 may control the motor 130 to rotate the display 110 in a portrait direction.

According to an embodiment, while the display 110 is rotated, the processor 140 may control the display 110 to maintain the ratio of the received image content. For example, when the ratio of the image content screen displayed prior to the rotation is 16:9, the processor 140 may control the display 110 to maintain the image content screen ratio to 16:9 while rotating the display 110.

The processor 140 may receive the direction information of the external device 105 through the communicator 150 in real time, and control the motor 130 to rotate the display 110 based on the received direction information. Specifically, when the direction of the external device 105 changes while the image content is displayed, the processor 140 may receive the changed direction information from the external device 105 and control the motor 130 to rotate the display 110 based on the received direction information.

The processor 140 may control the display 110 to display a UI asking the user whether to rotate the display 110. For example, if the direction of the external device 105 and the direction of the display 110 do not coincide with each other, the processor 140 may control the display 110 to display a UI including a text "would you like to rotate the display?" When a command to rotate the display 110 is input from the user through an inputter 160, the processor 140 may control the motor 130 to rotate the display 110.

The processor 140 may analyze the image content received from the external device 105 through the communicator 150 and determine a display direction of the image content. For example, the processor 140 may determine a display direction of the image content by calculating a landscape ratio and a portrait ratio of the image content screen received from the external device 105. By way of another example, the processor 140 may determine a display direction of the image content based on an object or a determined direction of an object (e.g., a text or an image) included in the image content received from the external device 105. If the display direction of the determined image content and the direction of the current display 110 are different, the processor 140 may control the display 110 to display a UI asking whether to rotate the display 110. When a command to rotate the display 110 is input from a user via the inputter 160, the processor 140 may control the motor 130 to rotate the display 110.

Meanwhile, the processor 140 may control the display 110 to display the image content received from the external device 105 in the entire area of the display 110. According to an embodiment, although the direction of the image content received from the external device 105 is in a landscape direction and the direction of the display 110 is a portrait direction, the processor 140 may control the display 110 to display the image content in the entire area of the display 110.

As illustrated in FIG. 3, the display apparatus 100 may include the display 110, the memory 120, the motor 130, the communicator 150, the inputter 160, and a speaker 170. Descriptions of these components that would be redundant with descriptions provided above may be omitted below.

The inputter 160 may receive a user input for controlling the display apparatus 100. In particular, the inputter 160 may include a touch panel for receiving a user touch using a user's hand or a stylus pen, a button for receiving a user operation, or the like. In addition, the inputter 160 may be implemented as another input device (for example, the remote controller 115, a virtual keyboard, a mouse, a motion inputter, a gesture sensor, a microphone and associated voice recognition software, or the like).

According to an embodiment, when a UI asking whether to rotate the display 110 is displayed on the display 110, the inputter 160 that is implemented as the remote controller 115 may receive an input to rotate the display 110 from a user.

The speaker 170 is a configuration to output various notification sounds or speech messages as well as various audio data in which various processing operations such as decoding, amplification, and noise filtering are performed by an audio processor. In particular, the speaker 170 may output a response to a user voice as a voice message in a natural language format. The configuration to output audio may be implemented as a speaker, but this is an example and may be implemented as an output terminal for outputting audio data.

The processor 140 may include a central processing unit 141, a bus 142, a read-only memory (ROM) 143, a graphics processing unit (GPU) 144, and a random access memory 145. The ROM 143, RAM 145, GPU 144, CPU 141, or the like, may be interconnected through the bus 142.

The CPU 141 accesses the memory 120 and performs booting using an operating system (OS) stored in the memory 120. The CPU 141 may perform various operations using various programs, contents, data stored in the memory 120, and the like. The operation of the CPU 141 is the same as or similar to the operation of the processor 140 of FIG. 2, and redundant descriptions may be omitted below.

The ROM 143 stores a command set for booting the system. When a turn-on command is input and power is supplied, the CPU 141 copies the OS stored in the memory 120 to the RAM 145 according to the command stored in the ROM 143, executes the OS, and boots the system. When the booting is completed, the CPU 141 copies various programs and/or instructions stored in the memory 120 to the RAM 145, executes the program(s) and/or instruction(s) copied to the RAM 145, and performs various operations.

When booting of the display apparatus 100 is completed, the GPU 144 may generate a screen including various objects such as an icon, an image, and a text. To be specific, the GPU 144 may generate a UI screen for inquiring whether to rotate the display 110.

Figure 4A:
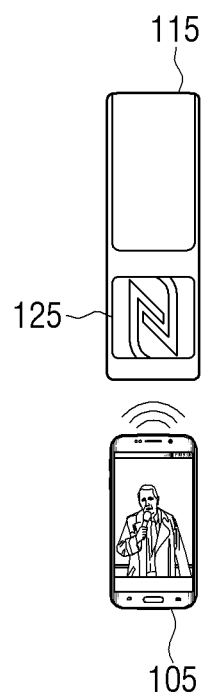
FIG. 4A is a view of a process in which an external device is tagged on a remote controller of a display apparatus according to an embodiment.
Figure 4B:
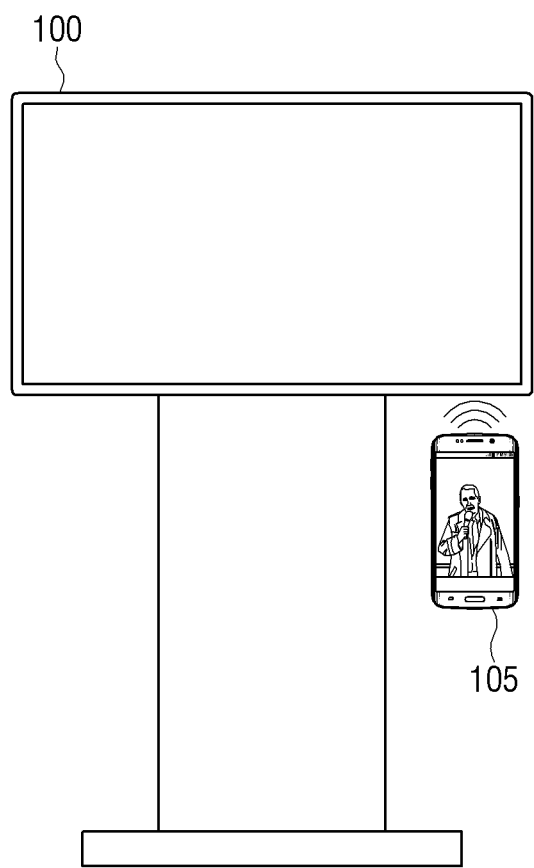
FIG. 4B is a view of a process in which an external device is tagged on a display apparatus according to an embodiment.

FIGS. 4A and 4B are views of a process in which the external device 105 is tagged on the remote controller 115 of a display apparatus 100 or the display apparatus 100 itself, according to an embodiment.

As illustrated in FIG. 4A, the external device 105 may be tagged on (e.g., brought into proximity or NFC range to read information transmitted from the NFC tag 125) the remote controller 115 that controls the display apparatus 100. According to an embodiment, when the external device 105 is tagged on the remote controller 115 having the NFC tag 125 including information related to the display apparatus 100, the display apparatus 100 and the external device 105 may be communicatively connected. That is, when the external device 105 approaches the NFC tag 125 that is embedded in the remote controller 115 of the display apparatus or mounted externally by a threshold distance (e.g., NFC range of NFC reader/module in external device 105), the display apparatus 100 and the external device 105 may connect communicatively. Specifically, the NFC tag 125 included in the remote controller 115 of the display apparatus 100 is driven by electromagnetic waves emitted from the NFC reader included in the external device 105 and may transmit, to the external device 105, an RF signal including a command to display (mirror) or transmit image content to the display apparatus 100 for display on the display 110 and including information related to the display apparatus 100 recorded in the NFC tag. The external device 105 may transmit the information related to the external device 105 to the display apparatus 100 using the received information related to the display apparatus 100 (e.g., MAC address), and the display apparatus 100 may connect with the external device 100 based on the received related information. As shown in FIG. 4B, the external device 105 may be tagged on the display apparatus 100 according to another embodiment. In this case, the external device 105 is tagged on an area of the display apparatus 100 in which the NFC tag including information related to the display apparatus 100 is embedded or mounted externally, and the display apparatus 100 and the external device 105 may be communicatively connected. That is, when the external device 105 approaches the NFC tag that is mounted inside or outside the display apparatus 100 by a threshold distance, the display apparatus 100 may communicate with the external device 105. Specifically, the NFC tag 125 mounted inside or outside the display apparatus 100 is driven by electromagnetic waves emitted from an NFC reader included in the external device 105, and may transmit, to the external device 105, an RF signal including a command to display the information (for example, the MAC address of the display apparatus 100) related to the display apparatus 100 that is recorded in the NFC tag and to transmit image content to the display apparatus 100 for display on the display 110. The display apparatus 100 may receive information related to the external device (for example, IP, communication history, network environment, or the like, of the external device 105) from the external device 105 and communicatively connect with the external device based on the received information. Therefore, when the external device 105 is tagged on the display apparatus 100 in the same manner as where the external device 105 is tagged on the remote controller 115, the display apparatus 100 may receive information related to the external device from the external device 105 and communicatively connect to the external device based on the received information. While in the above description of embodiments describes the NFC tag 125 as passive, it is understood that one or more other embodiments are not limited thereto and the NFC tag 125 may be active and/or powered by the device to which it is attached.

Figure 5A:
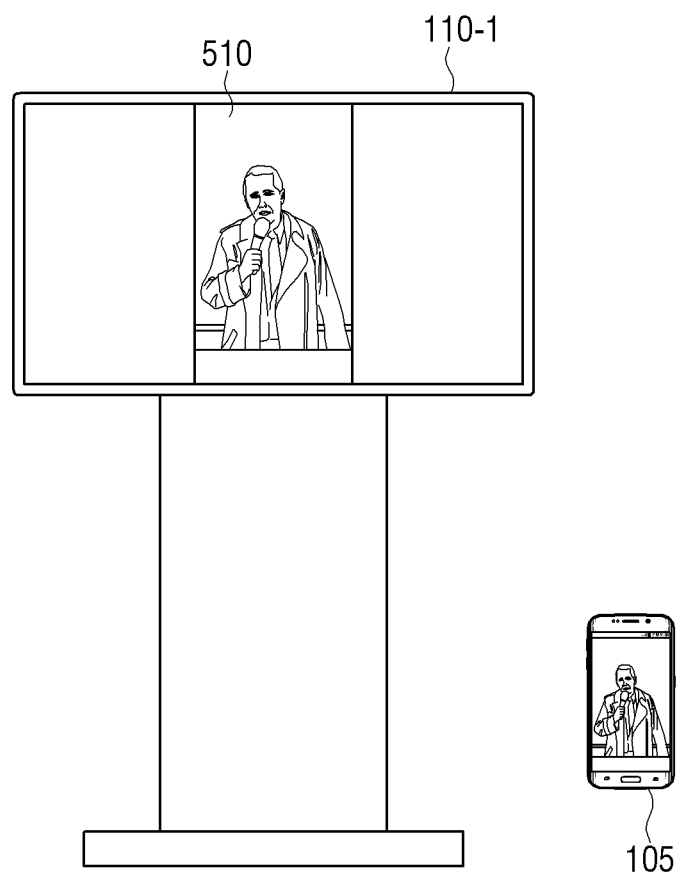
FIG. 5A is a view of a process of receiving an image from an external device by a related-art display apparatus according to an embodiment.

As illustrated in FIG. 5A, in the related art, when a screen that is displayed in the external device 105 is in a portrait direction, the image content received from the external device 105 is displayed only in one area 510 of the display 110-1 in a landscape direction.

Figure 5B:
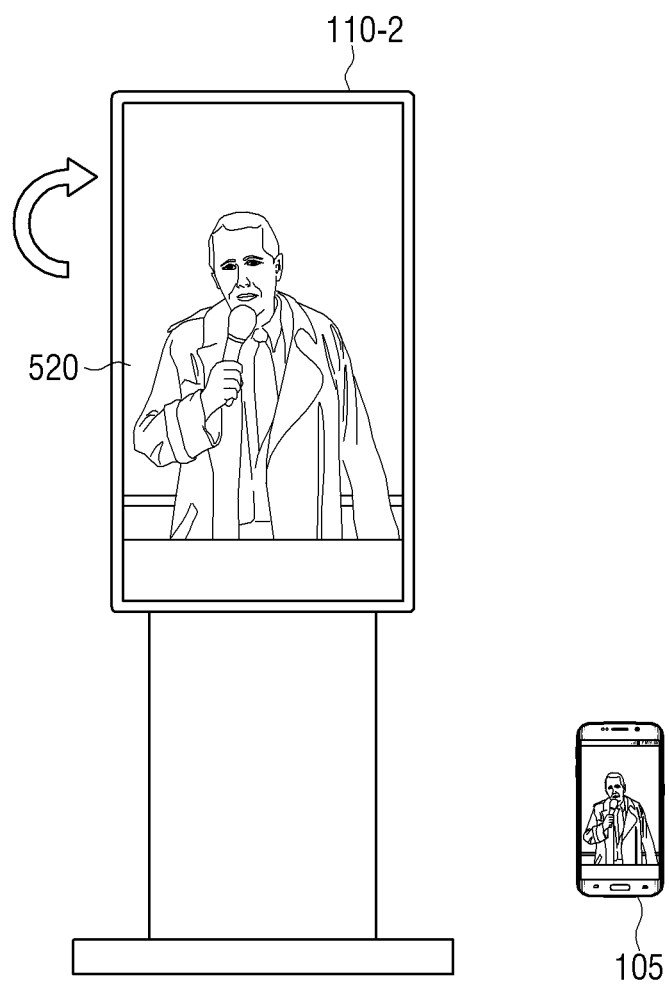
FIG. 5B is a view of a process of receiving an image from an external device and rotating a display according to an embodiment.

Meanwhile, a display apparatus 100 according to one or more embodiment determines that the direction of the external device 105 does not coincide with the direction of the display 110 based on the direction information received from the external device 105 through the communicator 150, and may control the motor 130 to rotate the display 110 and control the display 110 to display an image content received on the rotated display 110. Thus, when the external device 105 is in the portrait direction and the display 110 is in the landscape direction 110-1, the display apparatus 100 may determine that the direction of the external device 105 does not coincide with the direction of the display 110, and control the motor 130 to rotate the display 110 to the portrait direction. Therefore, the display apparatus 100 may display the image content 520 received from the external device 105 on the full screen in a display 110-2 in the portrait direction, as shown in FIG. 5B.

When the display apparatus 100 determines that the direction of the external device 105 coincides with the direction of the display 110, the display apparatus 100 may display an image content received from the external device 105 without rotating the display 110.

Figure 6A:
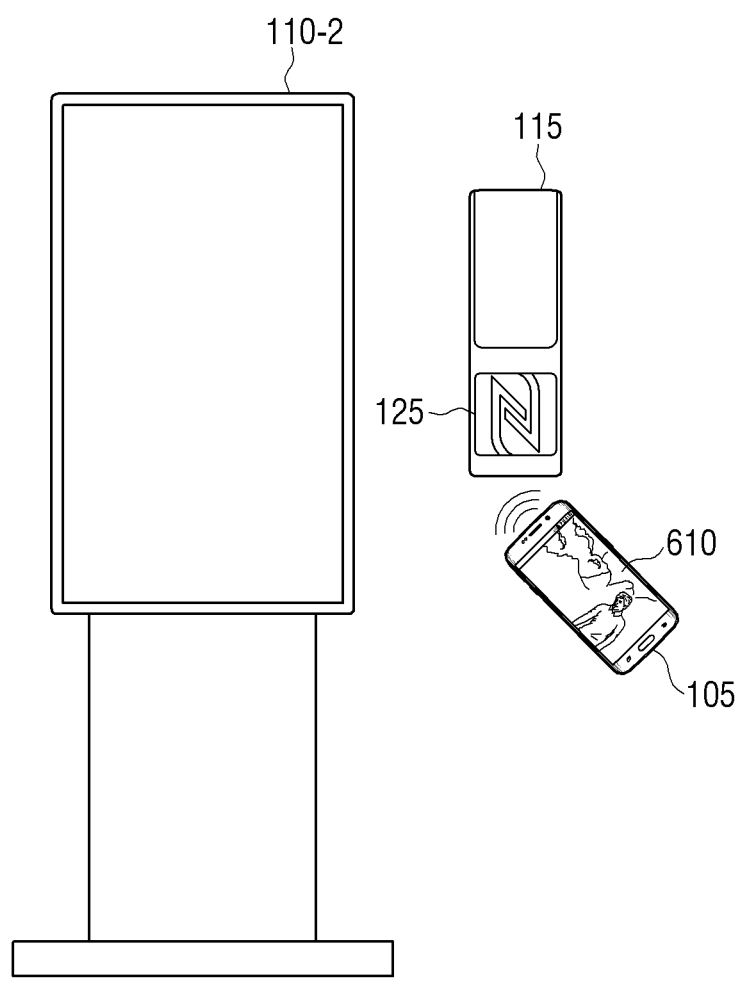
FIG. 6A is a view of a process of tagging an external device on a remote controller of the display apparatus according to an embodiment.
Figure 6B:
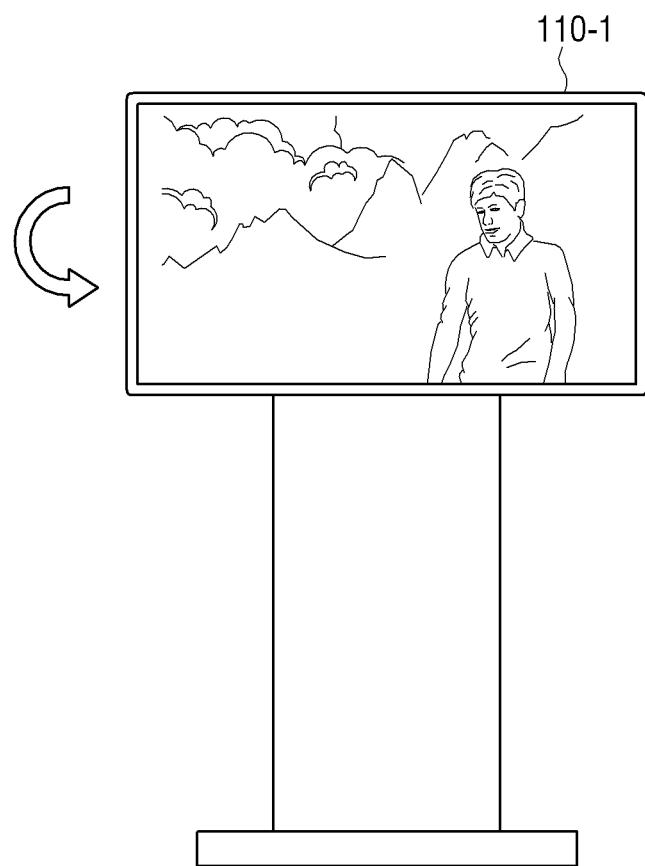
FIG. 6B is a view of a process of receiving an image from an external device by a display apparatus and rotating a display according to an embodiment.

FIGS. 6A and 6B are views of a process of tagging the external device 105 on the remote controller 105 and a process of receiving the image content from the external device 105 by the display apparatus 100 and rotating the display 110 according to an embodiment. As illustrated in FIG. 6A, the external device 105 displaying an image content 610 in the landscape direction may be tagged on the remote controller 115. When the external device 105 is tagged on the NFC tag 125 that is embedded inside or externally mounted on the remote controller 115, the display apparatus 100 connects communicatively with the external device 105 based on information (for example, IP, network environment, security setting of the external device 105) related to the external device received from the external device 105. In addition, the display apparatus 100 may receive direction information from the external device 105 during communication.

As illustrated in FIG. 6B, the display apparatus 100 may rotate the display 110 based on the direction information received from the external device 105 through the communicator 150. To be specific, the display apparatus 100 may determine whether the received direction of the external device 105 coincides with the direction of the current display 110. When the direction of the external device 105 is a landscape direction but the display 110-2 is in a portrait direction, the display apparatus 100 may determine that the direction of the external device 105 and the direction of the display 110 do not coincide with each other, and control the motor 130 to rotate the display 110-1 to be in a landscape direction.

Figure 7A:
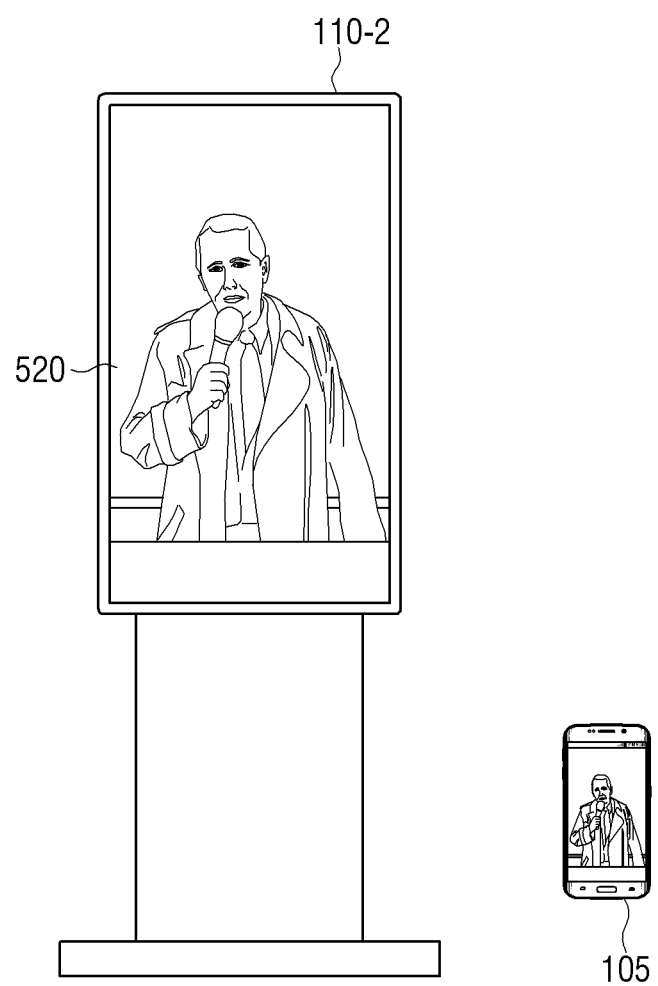
FIG. 7A is a view of a process of displaying an image received by a display apparatus from an external device according to an embodiment.
Figure 7B:
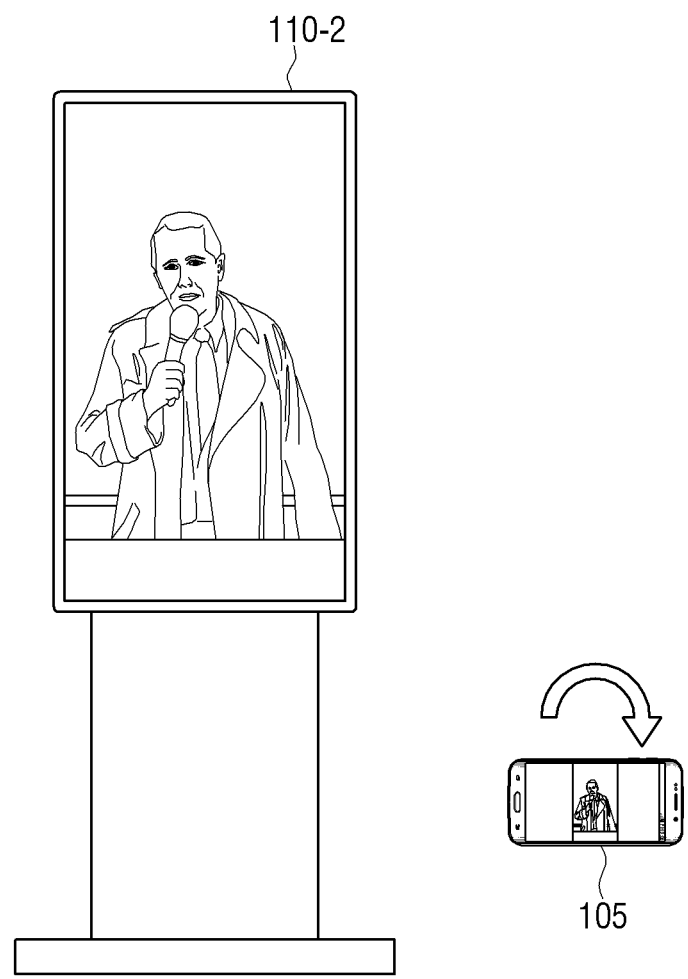
FIG. 7B is a view of rotating an external device while displaying an image received from an external device by a display apparatus according to an embodiment.
Figure 7C:
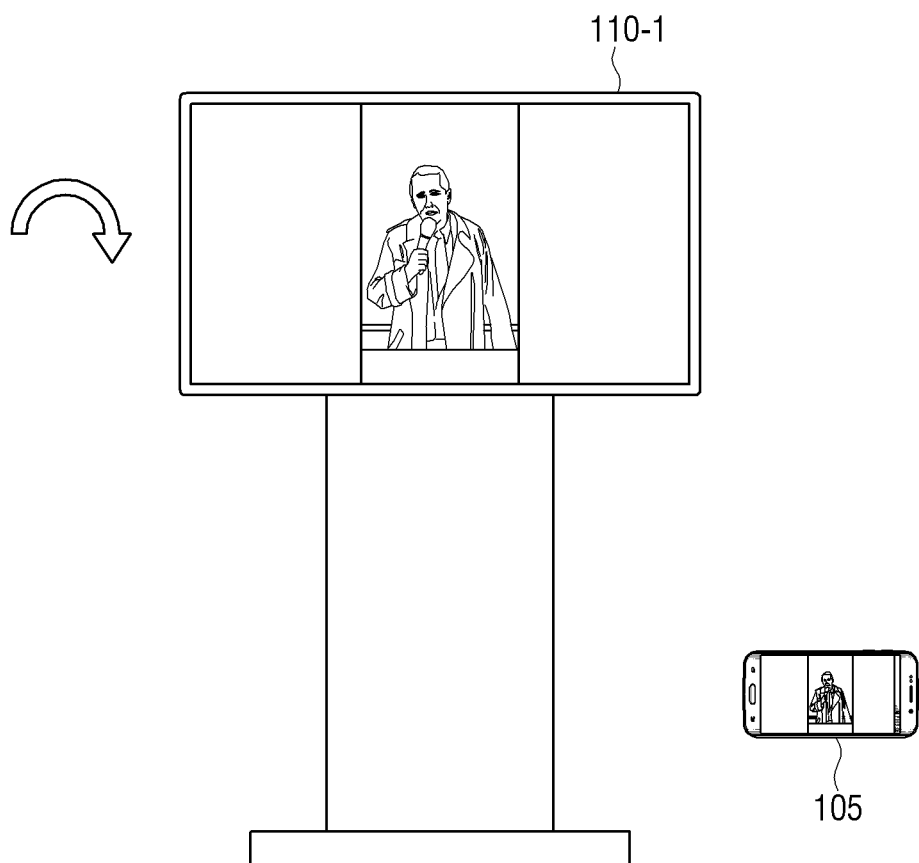
FIG. 7C is a view of a process of rotating a display based on rotation of an external device by a display device according to an embodiment.

FIGS. 7A to 7C are views of a process in which, while the display apparatus 100 displays an image content received through the communicator 150, if a direction of the external device 105 changes, the display 110 is rotated by the display apparatus 100 to match the changed direction.

As shown in FIG. 7A, the display apparatus 100 may display the image content 520 received through the communicator 150 from the external device 105 on the display 110-2 in the portrait direction. As illustrated in FIG. 7B, the display apparatus 100 may receive the changed direction information of the external device 105 from the external device 105 while displaying the image 520 received through the communicator 150. That is, while communication between the display apparatus 100 and the external device 105 is performed, the display apparatus 100 may receive the changed direction information from the external device 105 in real time. According to an embodiment, the display apparatus 100 may receive information from the external device 105 that the external device 105 has been changed from the portrait direction to the landscape direction while displaying the received image content 520. As shown in FIG. 7C, the display apparatus 100 may adjust the motor 130 to rotate to the display 110-1 in the landscape direction based on the received direction information of the external device 105.

Figure 8A:
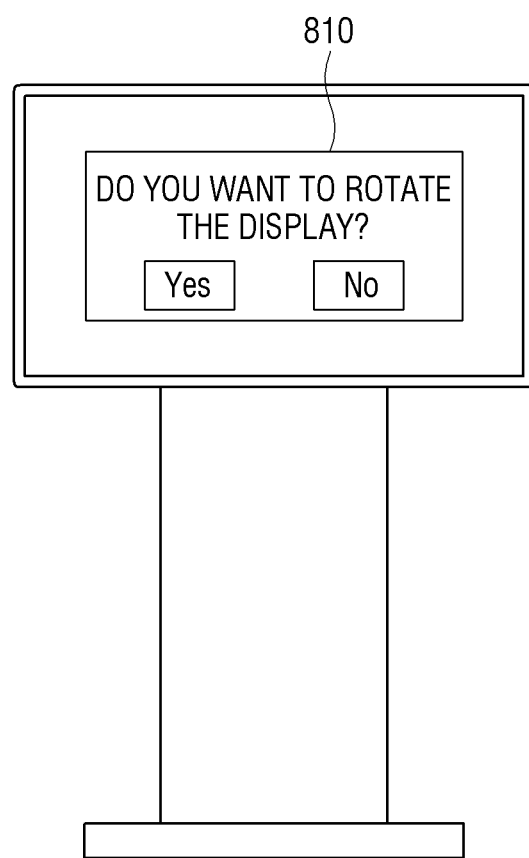
FIG. 8A is a view to describe a process of displaying a UI asking whether to rotate a display by a display apparatus according to an embodiment.
Figure 8B:
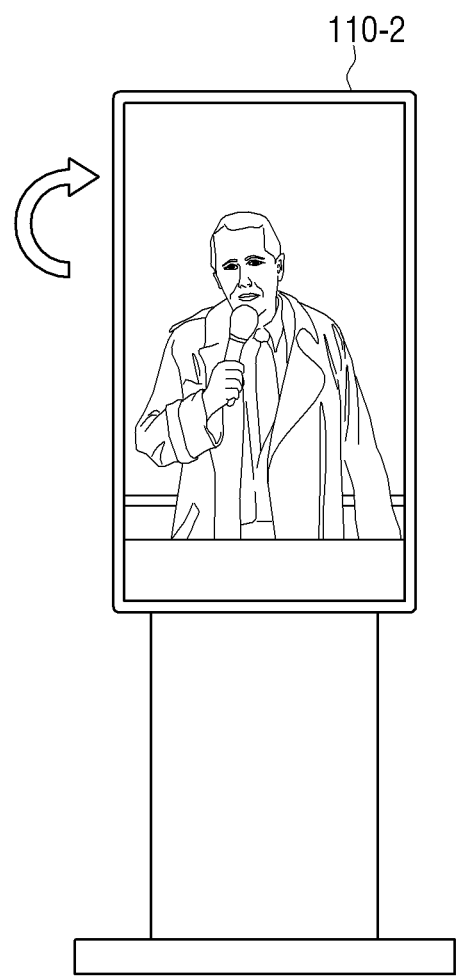
FIG. 8B is a view to describe a process of rotating a display according to a user selection in a UI by a display apparatus according to an embodiment.

FIGS. 8A and 8B are views to describe a process of displaying a UI 810 asking whether to rotate the display 110 by the display apparatus 100 according to an embodiment. As shown in FIG. 8A, the display apparatus 100 may display a UI for asking a user whether to rotate the display 110. According to an embodiment, based on the display apparatus 100 determining that the direction of the display 110 does not coincide with the direction of the external device 105, the display apparatus 100 may display a UI 810 asking the user whether to rotate the display 110. The UI 810 that inquires whether to rotate the display 110 may include the text "Do you want to rotate the display?". This is only an example, and the UI 810 inquiring whether to rotate the display 110 may include not only a text but also a figure, a video, or the like, which ask whether to rotate the display 110. The UI 810 asking whether to rotate the display 110 may be displayed in one area of the display 110 and may be simultaneously displayed with the received image content. The display apparatus 100 may receive a command to rotate the display 110 from the user through the inputter 160 such as a remote controller 115, a virtual keyboard, a user recognition sensor, and the like. As shown in FIG. 8B, when a command to rotate the display 110 is input from the user through the inputter 160 such as the remote controller 410, the display apparatus 100 may control the motor 130 to rotate the display 110 to the display 110-2 in the portrait direction, which is in the same direction as the direction of the external device 105. The display apparatus 100 may display image content received from the external device 105 on the rotated display 110. If the user inputs a command not to rotate the display 110 through the inputter 160, the display apparatus 100 may display the image content received from the external device 105 without rotating the display 110.

Figure 9A:
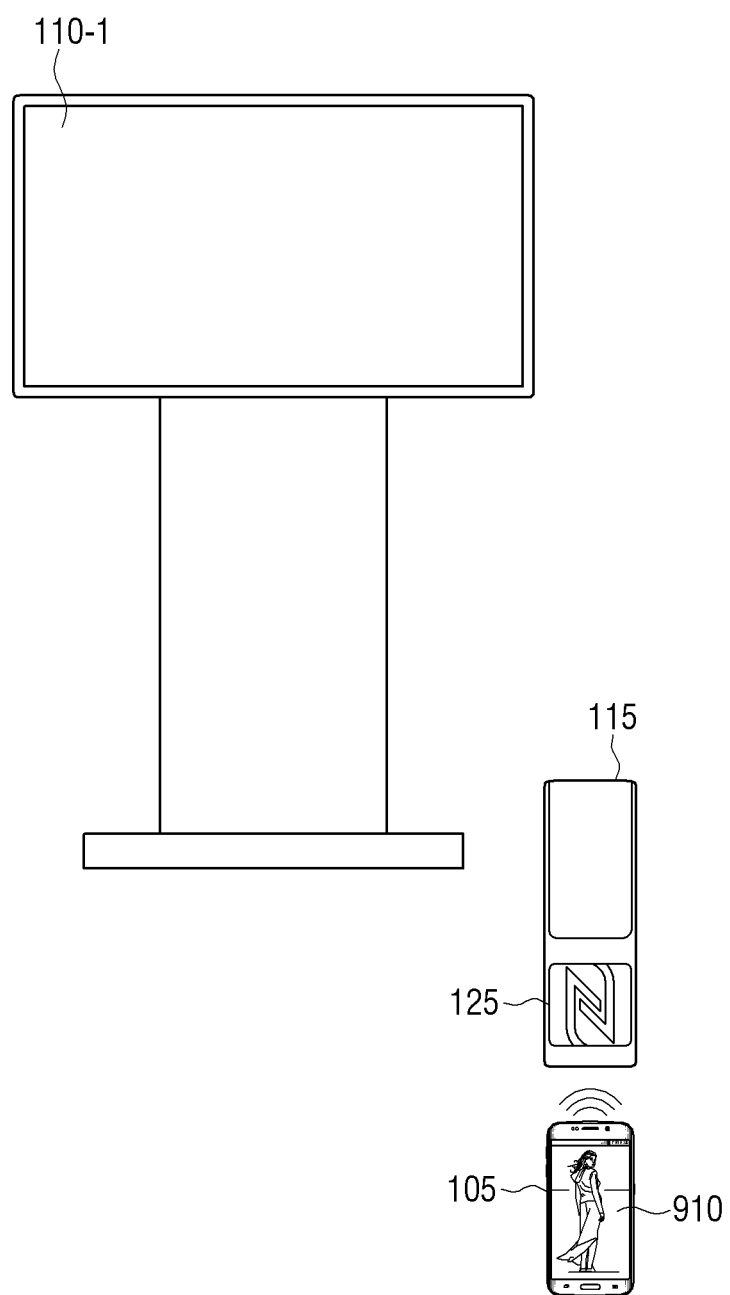
FIG. 9A is a view of a process of receiving an image content by a display apparatus from an external device according to an embodiment.
Figure 9B:
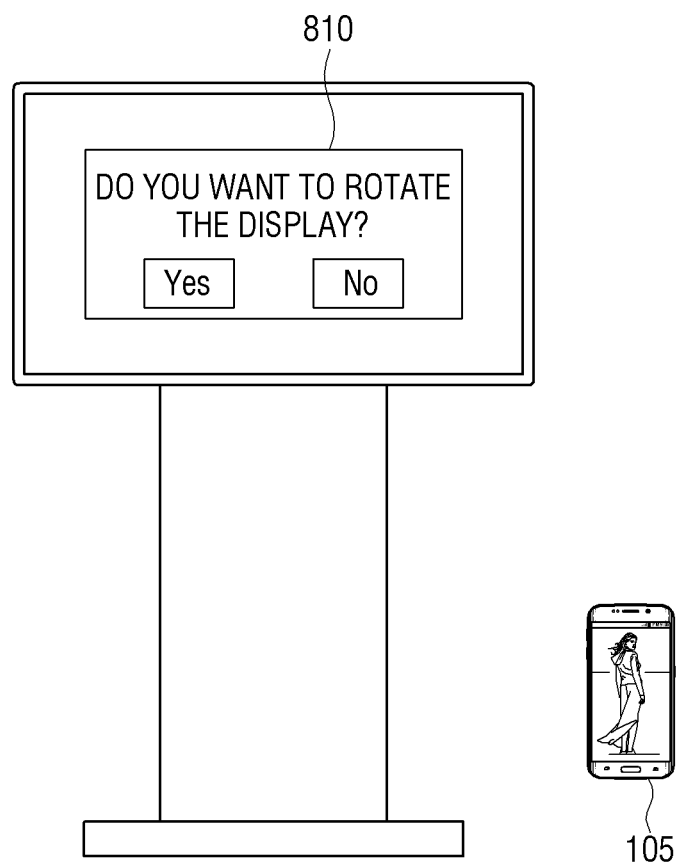
FIG. 9B is a view of a process of displaying a UI asking whether to rotate a display by a display apparatus according to an embodiment.
Figure 9C:
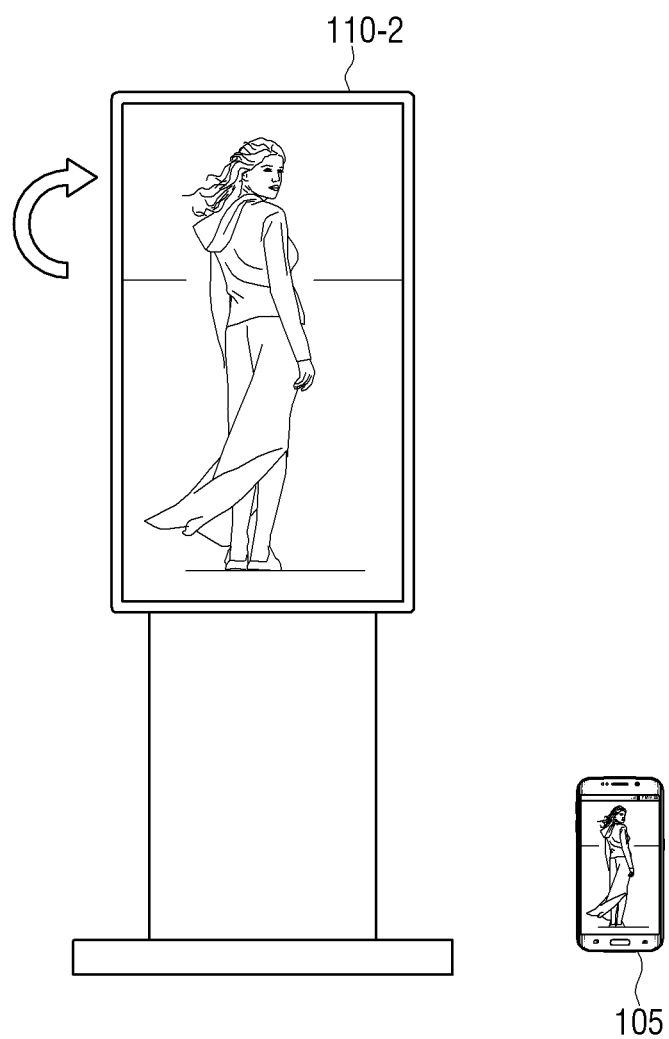
FIG. 9C is a view of a process of displaying an image content by rotating a display by a display apparatus according to an embodiment.

FIGS. 9A to 9C illustrate that the display apparatus 100 analyzes the image content 910 received from the external device 105 through the communicator 150 to determine the display direction of the image content 910, according to an embodiment. If the display direction of the content 910 and the current display direction of display 110 are different from each other, a process of displaying a UI for inquiring whether to rotate the display 110 is performed. For example, as illustrated in FIG. 9A, the display apparatus 100 may receive the image content 910 from the external device 105 that is communicatively connected. The display apparatus 100 may determine the display direction of the image content 910 by analyzing the received image content 910. By way of example, the display apparatus 100 may calculate the aspect ratio of the received image content 910 and determine the display direction of the image content 910 based on the calculated aspect ratio. When the aspect ratio of the received image content 910 is 9:16, the display apparatus 100 may determine the direction of the image content 910 in the portrait direction, since the received image content 910 has a larger portrait to landscape ratio.

According to another embodiment, the display apparatus 100 may determine a display direction of the image content based on an object (e.g., text, face, person, thing, or an image) included in the received image content. Specifically, if the person and the background image included in the received image content cannot be displayed in full screen on the display 110-2 in the portrait direction, but may be displayed in full screen on the display 110-1 in the landscape direction, the display apparatus 100 may determine the direction of the image content in the landscape direction.

If the direction of the display 110 and the direction of the determined image content 910 do not coincide with each other, the display apparatus 100 may display the UI 810 asking whether to rotate the display 110. The UI 810 asking whether to rotate the display 110 may include a text "Do you want to rotate the display?" This is merely exemplary, and the UI 810 asking whether to rotate the display 110 may include other items, such as figures, video asking whether to rotate the display 110, etc., in addition to the text. The UI 810 inquiring whether to rotate the display 110 may be displayed concurrently with the received image content 910. In addition, the display apparatus 100 may receive a command to rotate the display 110 from the user through the inputter 160 such as a remote controller 410, a virtual keyboard, a user recognition sensor, or the like. As illustrated in FIG. 9C, when a command to rotate the display 110 is input from the user, the display apparatus 100 may rotate the display to be the display 110-2 in the portrait direction. In addition, the display apparatus 100 may display the image content 910 received while the display 110 is rotated.

Figure 10:
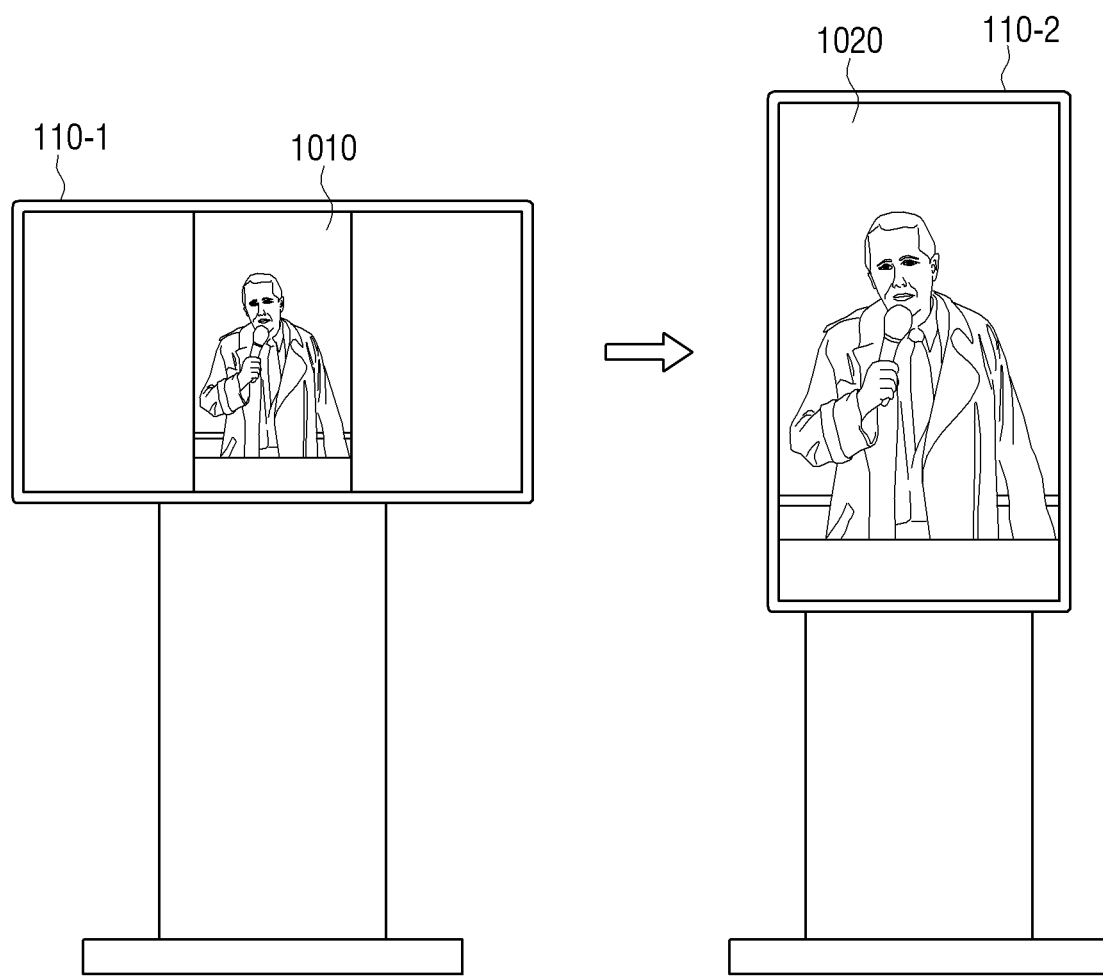
FIG. 10 is a view of a process of rotating a display while maintaining an image content ratio by a display apparatus according to an embodiment.

FIG. 10 illustrates a process of rotating the display 110 while maintaining the image content ratio of the display apparatus 100 according to an embodiment. In an embodiment, the display apparatus 100 may display an image content 1010 having an aspect ratio of 9:16. The display apparatus 100 may analyze the image content 1010 to determine the display direction of the image content 1010, and determine that the determined direction of the image content 1010 is a portrait direction. Since the current direction of the display 110-1 is the landscape direction, the display apparatus 100 may determine that the direction of the display 110 and the direction of the image content 1010 do not coincide, and display the UI 810 asking whether to rotate the display 110. When a command to rotate the display 110 is input from the user, the display apparatus 100 may control the motor 130 to rotate the display 110 to the portrait direction 110-2. In addition, while the display apparatus 100 rotates the display 110, the display 110 may be controlled such that the ratio of the image content 1020 is the same as the ratio of the image content 1010 displayed on the landscape direction display 110-1.

Figure 11:
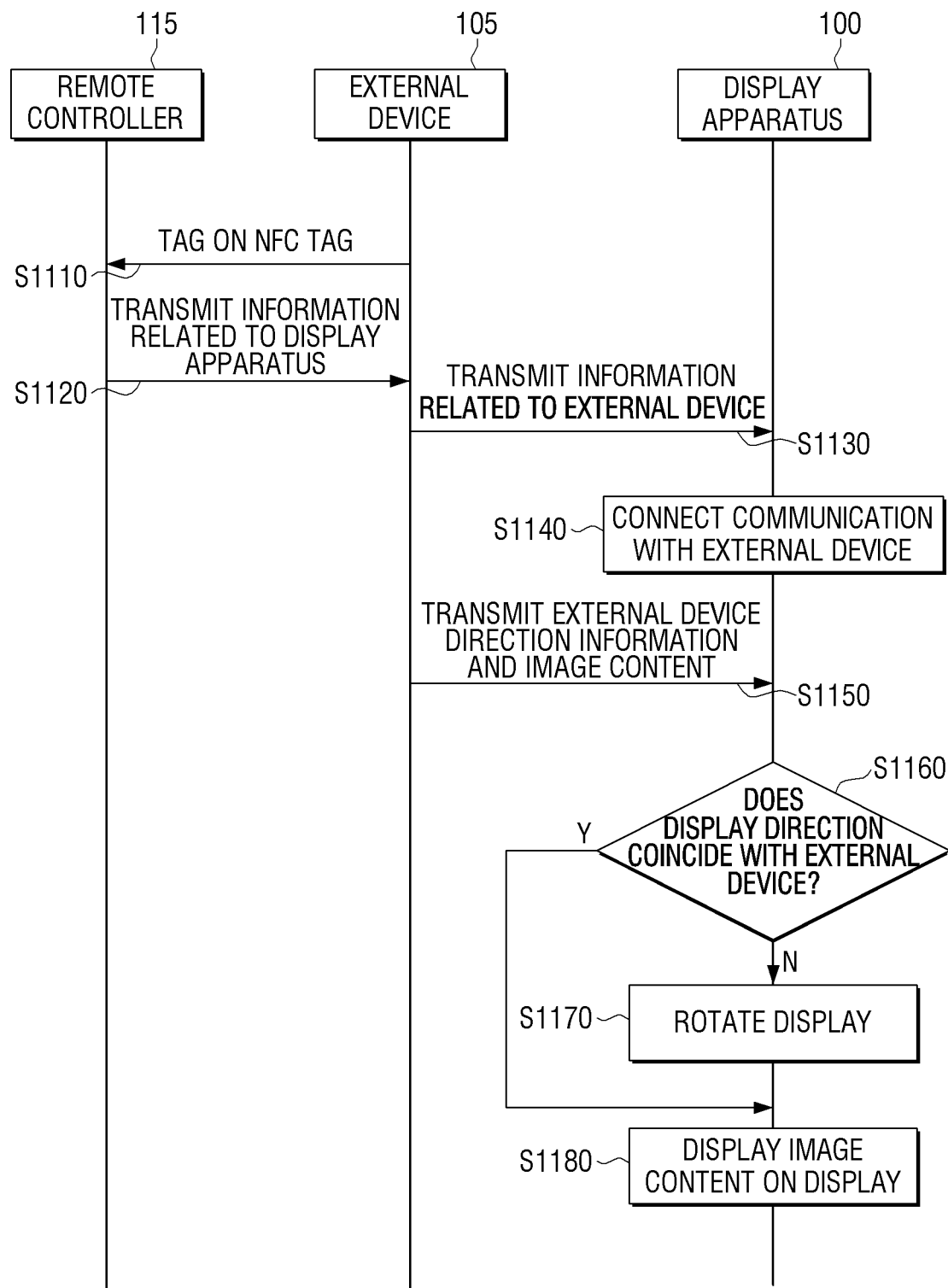
FIG. 11 is a sequence diagram to describe a controlling method of a display apparatus according to an embodiment.

FIG. 11 is a sequence diagram to describe a controlling method of a display apparatus 100 according to an embodiment.

Referring to FIG. 11, an external device 105 may be tagged on an NFC tag 125 that is built in or externally mounted on a remote controller 115 for controlling the display apparatus 100 in operation S1110. The NFC tag 125 may include a information related to the display apparatus 100 (for example, the MAC address of the display apparatus) and a command for transmitting the image content of the external device 105 to the display apparatus 100. Accordingly, when the external device 105 is tagged on the NFC tag 125, the external device 105 may receive information related to the display apparatus 100 through NFC in operation S1120.

In addition, the display apparatus 100 may receive information related to the external device 105 from the external device 105 through the communicator 150 in operation S1130. In operation S1140, the display apparatus 100 may connect communicatively with the external device 105 based on the received information related to the external device 105. While performing communication with the external device 105, the display apparatus 100 may receive direction information and image content of the external device 105 from the external device 105 through the communicator 150 in operation S1150. In operation S1160, the display apparatus 100 may determine whether the direction of the display 110 and the direction of the external device 105 coincide with each other. If the direction of the display 110 and the direction of the external device 105 do not coincide, the display apparatus 100 may control the motor 130 to rotate the direction of the display 110 in operation S1170. In operation S1180, the display apparatus 100 may display the image content received from the external device 105 on the rotated display 110. If the direction of the display 110 and the direction of the external device 105 coincide with each other, the display apparatus 100 may control the display 110 to display the image content without rotating the display 110 in operation S1180.

Figure 12:
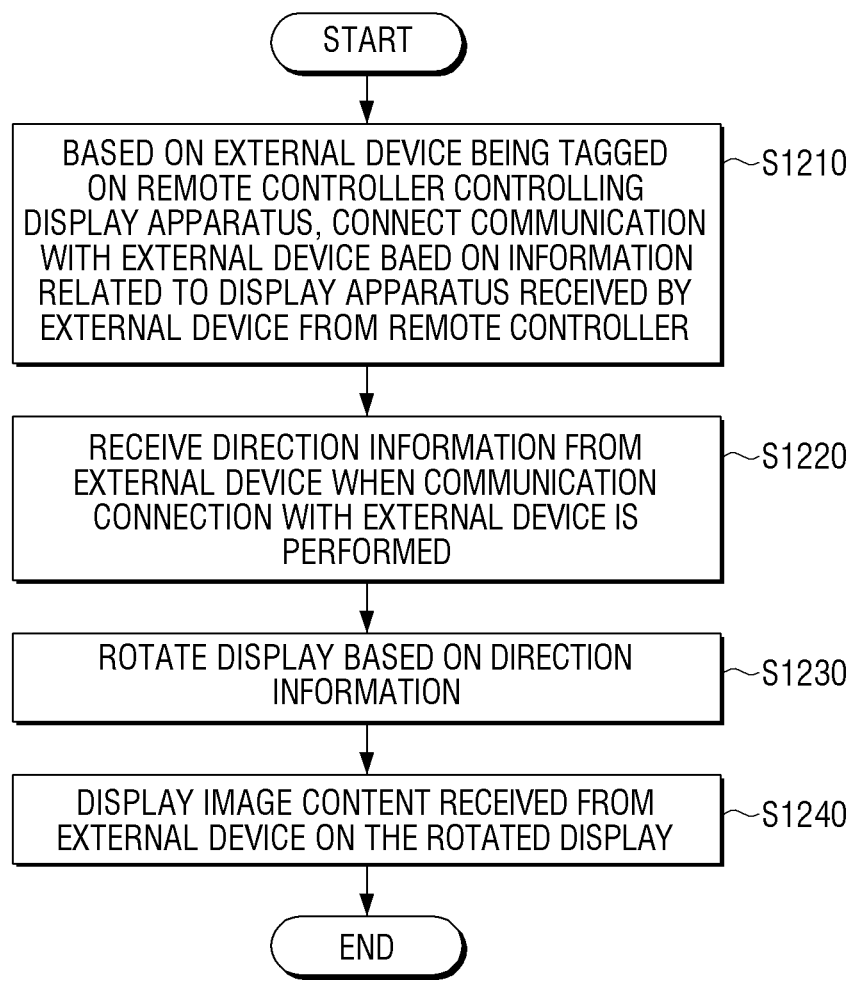
FIG. 12 is a flowchart to describe a controlling method of a display apparatus according to an embodiment.

FIG. 12 is a flowchart to describe a controlling method of a display apparatus 100 according to an embodiment.

Referring to FIG. 12, if an external device 105 is tagged on a remote controller 115 that controls display apparatus 100, the display apparatus 100 may connect communicatively with the external device 105 based on information associated with the display apparatus 100 received from the remote controller 115 in operation S1210. Specifically, the external device 105 may be tagged on the NFC tag 125 embedded inside or mounted outside of the display apparatus 100 or the remote controller 115. When the external device 105 with the NFC reader is tagged on the NFC tag 125 or is near-accessed with the NFC module 152, the NFC tag 125 may be driven by an electromagnetic wave emitted from the NFC reader and transmit (or the NFC module 152 may transmit) an RF signal on which information associated with the display apparatus 100 recorded in the NFC tag is loaded to the external device 105. In addition, the display apparatus 100 may receive information (for example, IP, network environment, security setting mode, or the like, of external device) related to the external device 105 from the external device 105, and connect communicatively with the external device 105 based on the received information.

While communicatively connected with the external device 105, the display apparatus 100 may receive direction information from the external device 105 in operation S1220. To be specific, the display apparatus 100 may receive information on whether the direction of the external device 105 is the landscape direction or the portrait direction. The display apparatus 100 may also receive the changed direction information of the external device 105 in real time.

In addition, the display apparatus 100 may rotate the display 110 based on the received direction information of the external device 105 in operation S1230. In an embodiment, the display apparatus 100 may determine whether the direction of the external device 105 coincides with the direction of the display 110. When, for example, the direction of the display 110 is the landscape direction and the direction of the external device 105 is the portrait direction, the display apparatus 100 may determine that the direction of the display 110 and the direction of the external device 105 do not coincide with each other. In addition, the display apparatus 100 may display a UI 810 asking whether to rotate the display 110. When a command to rotate the display 110 is input from the user, the display apparatus 100 may control the motor 130 to rotate the display 110 to the portrait direction, which is the direction of the external device 105.

In addition, the display apparatus 100 may display the image content received from the external device 105 on the rotated display 110 in operation S1240. The display apparatus 100 may display the received image content in the entire area of the display 110 and control the display 110 to display the image content while maintaining the ratio (aspect ratio) during the rotation.

The term "unit" or "module" used in the disclosure includes units consisting of hardware, software, and/or firmware, and may be used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

One or more embodiments of the disclosure may be implemented as software that includes instructions stored in machine-readable storage media readable by a machine (e.g., a computer). A device may call instructions from a storage medium and operate in accordance with the called instructions, including an electronic apparatus (e.g., the display apparatus 100). When the instruction is executed by a processor, the processor may perform the function corresponding to the instruction, either directly or under the control of the processor, using other components. The instructions may include a code generated or executed by a compiler or an interpreter. The machine-readable storage medium may be provided in the form of a non-transitory storage medium. Here, "non-transitory" means that the storage medium does not include a signal and is tangible, but does not distinguish whether data is permanently or temporarily stored in a storage medium.

Each of the components (for example, a module or a program) according to one or more embodiments may be composed of one or a plurality of objects, and some subcomponents of the subcomponents described above may be omitted, or other subcomponents may be further included. Alternatively or additionally, some components (e.g., modules or programs) may be integrated into one entity to perform the same or similar functions performed by each respective component prior to integration. Operations performed by a module, program, or other component, in accordance with the embodiments, may be performed sequentially, in a parallel, repetitive, or heuristic manner, or at least some operations may be performed in a different order, omitted, or other operations can be added.

What is claimed is:

1. A display apparatus comprising:
a communicator including a circuitry;
a display;
a motor;
a memory storing at least one instruction; and
a processor configured to execute the at least one instruction to:
in response to an external device being tagged to the communicator, control the communicator to establish a communicative connection with the external device,
obtain, from the external device, an image content displayed on the external device and direction information indicating an orientation of the external device,
identify, based on the direction information of the external device, whether to rotate the display, and
control the motor to rotate the display based on whether to rotate the display and control the display to display the image content.

2. The display apparatus of claim 1, wherein the processor is further configured to execute the at least one instruction to receive, from the external device through the communicator, the information related to the external device, and to connect to the external device based on the information related to the external device.

3. The display apparatus of claim 1, wherein the communicator includes a near field communication (NFC) tag.

4. The display apparatus of claim 1, wherein the processor is further configured to execute the at least one instruction to:
based on a determination that a direction of the external device does not coincide with a direction of the display according to the direction information, control the motor to rotate the display and control the display to display the image content on the rotated display; and
based on a determination that the direction of the external device coincides with the direction of the display according to the direction information, control the display to display the image content without rotating the display.

5. The display apparatus of claim 4, wherein the processor is further configured to execute the at least one instruction to:
based on the display being in a landscape direction and the direction of the display not coinciding with the direction of the external device, control the motor to rotate the display to a portrait direction; and
based on the display being in the portrait direction and the direction of the display not coinciding with the direction of the external device, control the motor to rotate the display to the landscape direction.

6. The display apparatus of claim 4, wherein the processor is further configured to execute the at least one instruction to, based on a determination that the direction of the external device does not coincide with the direction of the display, control the display to display a user interface (UI) item for selecting whether to rotate the display.

7. The display apparatus of claim 1, wherein the processor is further configured to execute the at least one instruction to, based on a direction of the external device being changed while the image content is being displayed on the display, receive changed direction information from the external device through the communicator, and control the motor to rotate the display according to the changed direction information.

8. The display apparatus of claim 1, wherein the processor is further configured to execute the at least one instruction to:
control the display to display a UI for selecting whether to rotate the display, based on a display direction of the image content being determined to be different from a direction of the display.

9. The display apparatus of claim 1, wherein the processor is further configured to execute the at least one instruction to control the display to display the image content while maintaining a ratio of the image content during rotation of the display.

10. A controlling method of a display apparatus comprising a communicator and a display, the method comprising:
in response to an external device being tagged to the communicator, establishing a communicative connection with the external device;
obtaining, from the external device, an image content displayed on the external device and direction information indicating an orientation of the external device;
identifying, based on the direction information of the external device, whether to rotate a display of the display apparatus; and
controlling to rotate the display based on the identifying whether to rotate the display and displaying the image content.

11. The controlling method of claim 10, wherein the connecting comprises:
receiving, from the external device, the information related to the external device, and
connecting to the external device based on the information related to the external device.

12. The controlling method of claim 10, wherein the communicator includes a near field communication (NFC) tag.

13. The controlling method of claim 10, wherein the controlling to rotate the display comprises:
based on a determination that a direction of the external device does not coincide with a direction of the display according to the direction information, controlling to rotate the display and displaying the image content on the rotated display; and
based on a determination that the direction of the external device coincides with the direction of the display according to the direction information, determining to display the image content without rotating the display.

14. The controlling method of claim 13, wherein the controlling to rotate the display comprises:
based on the display being in a landscape direction and the direction of the display not coinciding with the direction of the external device, controlling to rotate the display to a portrait direction; and
based on the display being in the portrait direction and the direction of the display not coinciding with the direction of the external device, controlling to rotate the display to the landscape direction.

15. The controlling method of claim 10, wherein the controlling to rotate the display comprises:
based on a direction of the external device being changed while the image content is being displayed on the display, receiving changed direction information from the external device, and controlling to rotate the display according to the received changed direction information.

16. The controlling method of claim 13, wherein the controlling to rotate the display comprises:
based on a determination that the direction of the external device does not coincide with the direction of the display, displaying a user interface (UI) item for selecting whether to rotate the display.

17. The controlling method of claim 10, wherein:
the identifying whether to rotate the display comprises displaying a UI for selecting whether to rotate the display, based on a display direction of the image content being determined to be different from a direction of the display.

18. The controlling method of claim 10, wherein the displaying the image content comprises:
displaying the image content while maintaining a ratio of the image content during rotation of the display.

* * * * *